United States Patent
Semersky et al.

(10) Patent No.: US 6,985,221 B2
(45) Date of Patent: Jan. 10, 2006

(54) METHOD AND APPARATUS FOR MEASURING WALL THICKNESS OF PLASTIC CONTAINER

(75) Inventors: Frank E. Semersky, Toledo, OH (US); Dennis T. Sturgill, Perrysburg, OH (US)

(73) Assignee: Petwall, LLC, Holland, OH (US)

( * ) Notice: Subject to any disclaimer, the term of this patent is extended or adjusted under 35 U.S.C. 154(b) by 301 days.

(21) Appl. No.: 10/220,404

(22) PCT Filed: Feb. 23, 2001

(86) PCT No.: PCT/US01/06012

§ 371 (c)(1),
(2), (4) Date: Aug. 30, 2002

(87) PCT Pub. No.: WO01/65204

PCT Pub. Date: Sep. 7, 2001

(65) Prior Publication Data

US 2003/0223086 A1    Dec. 4, 2003

Related U.S. Application Data

(60) Provisional application No. 60/186,188, filed on Mar. 1, 2000.

(51) Int. Cl.
*G01B 11/06* (2006.01)
(52) U.S. Cl. ............... 356/239.6; 356/632; 250/223 B
(58) Field of Classification Search ............... 356/632, 356/239.4, 239.6, 630, 631; 250/223 B
See application file for complete search history.

(56) References Cited

U.S. PATENT DOCUMENTS

| 3,439,178 A |   | 4/1969 | Rottmann |
|---|---|---|---|
| 3,456,788 A |   | 7/1969 | Stapf et al. |
| 3,684,089 A |   | 8/1972 | McMeekin |
| 3,721,501 A | * | 3/1973 | Atkinson et al. ........... 356/432 |
| 3,827,812 A |   | 8/1974 | Heimann |
| 3,860,818 A | * | 1/1975 | Stalder et al. .............. 250/343 |
| 3,980,890 A |   | 9/1976 | Heckrodt et al. |
| 4,304,995 A |   | 12/1981 | Huttunen et al. |
| 4,486,136 A |   | 12/1984 | Howard |
| 4,510,389 A |   | 4/1985 | Fumoto |
| 4,694,158 A |   | 9/1987 | Leser |
| 4,720,808 A |   | 1/1988 | Repsch |
| 4,989,970 A |   | 2/1991 | Campbell et al. |

(Continued)

FOREIGN PATENT DOCUMENTS

WO    WO 01/65204 A1    7/2001

(Continued)

*Primary Examiner*—Richard A. Rosenberger
(74) *Attorney, Agent, or Firm*—Fraser Martin Buchanan Miller LLC; Donald R. Fraser

(57) ABSTRACT

A method for measuring the wall thickness of plastic containers (16) during a container manufacturing process includes providing a plastic container (16), the plastic container (16) having a longitudinal axis and at least two side walls spaced radially from the longitudinal axis. The side walls are formed of a material that absorbs light energy in a predetermined molecular absorption band. Light energy is then directed from a source unit (32) through the at least two side walls of the plastic container (16) in a plane transverse to the longitudinal axis of the plastic container (16). A portion of the light energy that passes through the sidewalls of the container (16) is sensed by a sensor (34), and a signal representing a thickness of the sidewalls of the plastic container is generated from the sensed portion of the energy by a computer (56).

38 Claims, 4 Drawing Sheets

U.S. PATENT DOCUMENTS

| | | |
|---|---|---|
| 5,138,178 A | 8/1992 | Wong et al. |
| 5,291,271 A | 3/1994 | Juvinall et al. |
| 5,291,422 A | 3/1994 | Esztergar |
| 5,354,984 A | 10/1994 | Baldwin |
| 5,585,603 A | 12/1996 | Vogeley, Jr. |
| 5,591,462 A | 1/1997 | Darling et al. |
| 6,142,641 A * | 11/2000 | Cohen et al. ............... 359/859 |
| 6,211,952 B1 | 4/2001 | Weiland et al. |
| 6,424,414 B1 | 7/2002 | Weiland et al. |

FOREIGN PATENT DOCUMENTS

| | | |
|---|---|---|
| WO | WO 02/33349 A1 | 4/2002 |

* cited by examiner

METHOD AND APPARATUS FOR MEASURING WALL THICKNESS OF PLASTIC CONTAINER

RELATED APPLICATIONS

This application claims the benefit of U.S. provisional application Ser. No. 60/186,188, filed Mar. 1, 2000.

FIELD OF THE INVENTION

The present invention relates to a method and apparatus for measuring wall thickness, and more particularly to a method and apparatus for measuring the wall thickness of plastic containers at the production line and during the production operation.

BACKGROUND OF THE INVENTION

One of the difficulties in blow molding plastic containers is the problem of maintaining uniform wall thickness throughout the height of the container. Even with well made preforms, slight deviations from ideal temperature distribution in the preform can cause nonuniformity and thin areas or regions in the sidewalls. Because of this problem it is usually necessary to use more resin than is needed theoretically in order to maintain minimum wall thickness specifications, resulting in higher production costs.

Currently, it is necessary for someone to pull sample containers from the output conveyor, cut them open, and manually measure the vertical wall thickness distribution. If the distribution is not satisfactory, the measurement data can indicate how the process needs to be adjusted. In some cases, there is a critical location where one measurement can indicate how the process is running. For example, if one area of the sidewall is running too thick, the additional thickness can indicate that some other area where the wall thickness is difficult to measure, such as the heel, is running too thin.

Wall thickness distribution information must be acquired as quickly as possible. If the manufacturing process is out of specification limits, a large quantity of scrap can be generated before the necessary information can be acquired and a correction made. The sectioning and manual measurement of the wall thickness distribution can be tedious, time consuming, and inaccurate. Consequently, the manufacturing process results in a large variation in container wall thickness, rarely approaching the optimum distribution necessary for achieving a desired minimum weight of the final product.

There are numerous off-line optical and mechanical systems which can be used to measure the wall thickness at various locations on a container. However, these generally require the container to be removed from the manufacturing machine, loaded upon or within the measuring system, and a large number of measurements made off-line. These systems are normally found in the quality control laboratory and cannot provide timely feedback to the forming process.

An object of the invention is to produce a plastic container wall thickness measuring system which minimizes production costs.

Another object of the invention is to produce a plastic container wall thickness measuring system, which minimizes product waste.

Still another object of the invention is to produce a plastic container wall thickness measuring system which minimizes production line downtime.

Another object of the invention is to produce a plastic container wall thickness measuring system, which can operate on-line and at a high speed during a plastic container manufacturing process.

A further object of the invention is to produce a plastic container wall thickness measuring system which can measure through both walls of the container simultaneously, and determine the average wall thickness by dividing the measurement by two.

Yet another object of the invention is to produce a plastic container wall thickness measuring system, which can make multiple thickness measurements at a given height on the container.

Still another object of the invention is to produce a plastic container wall thickness measuring system, which can make multiple thickness measurements from multiple heights on the container.

SUMMARY OF THE INVENTION

The above, as well as other objects of the invention, may be readily achieved by a method for measuring the wall thickness of plastic containers during a container manufacturing process including: providing a plastic container, the plastic container having a longitudinal axis and at least two side walls spaced radially from the longitudinal axis, the side walls being formed of a material that absorbs light energy in a predetermined molecular absorption band; directing light energy from a source through the at least two side walls of the plastic container in a plane transverse to the longitudinal axis; sensing a portion the light energy that passes through the side walls of the plastic container; and generating a signal from the sensed portion of the light energy representing a thickness of the side walls of the plastic container.

The subject invention also includes a plastic container wall thickness measuring system comprising: a source of light energy directed toward a path of travel of a plastic container, the plastic container having side walls formed of a material absorbing a first portion of the light energy; a light sensor for receiving a second portion of the light energy, the second portion of the light energy having passed through the side walls of the plastic container, and being responsive to the second portion of the light energy for generating a signal; and a computer means connected to the sensor and being responsive to the signal when the plastic container moves along the path between the source and the sensor for calculating an average wall thickness value from a selected number of positions of the plastic container along the path, comparing the average wall thickness value with stored standards and indicating one of acceptance and rejection for the plastic container.

BRIEF DESCRIPTION OF THE DRAWINGS

The above, as well as other objects, features, and advantages of the present invention will be understood from the detailed description of the preferred embodiments of the present invention with reference to the accompanying drawings, in which.

DETAILED DESCRIPTION OF THE PREFERRED EMBODIMENT

Figure 1:
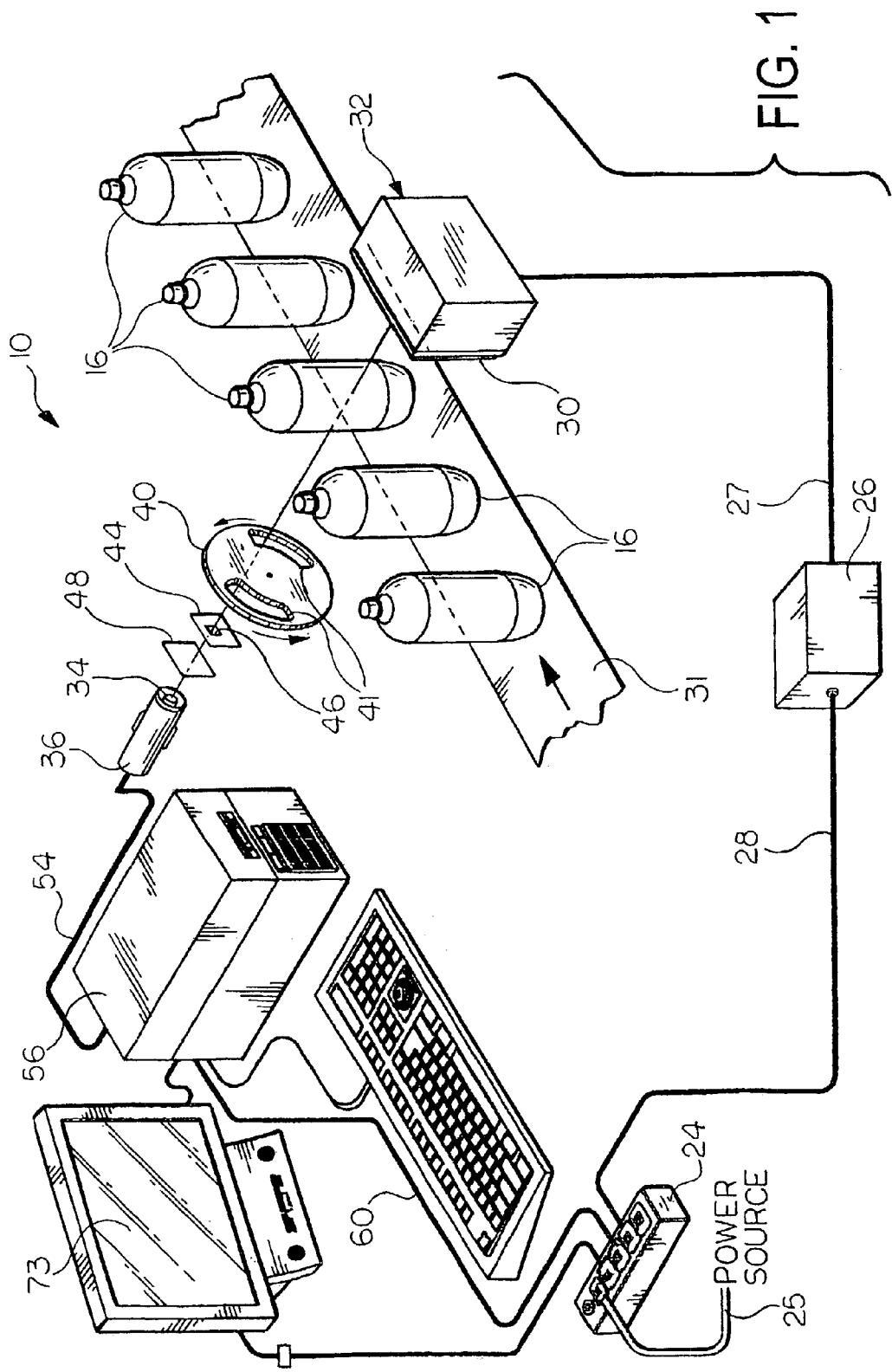
FIG. 1 is a partially exploded perspective view of the plastic container wall thickness measuring system with the support frames removed, incorporating the features of the invention.
Figure 2:
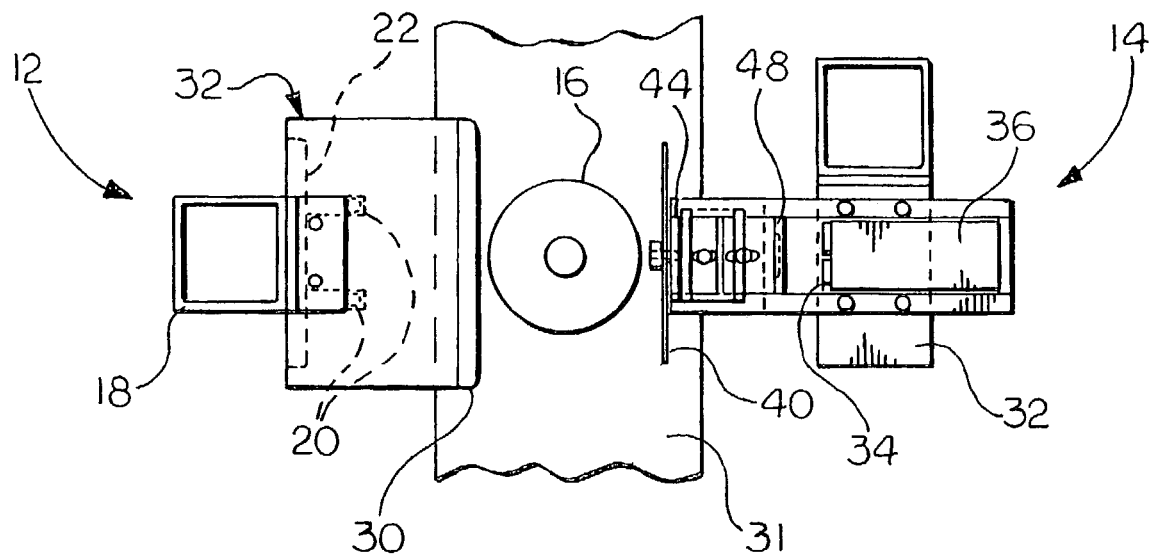
FIG. 2 is a top plan view of the emitter assembly and the sensor assembly portions of the plastic container wall thickness measuring system illustrated in FIG. 1.
Figure 3:
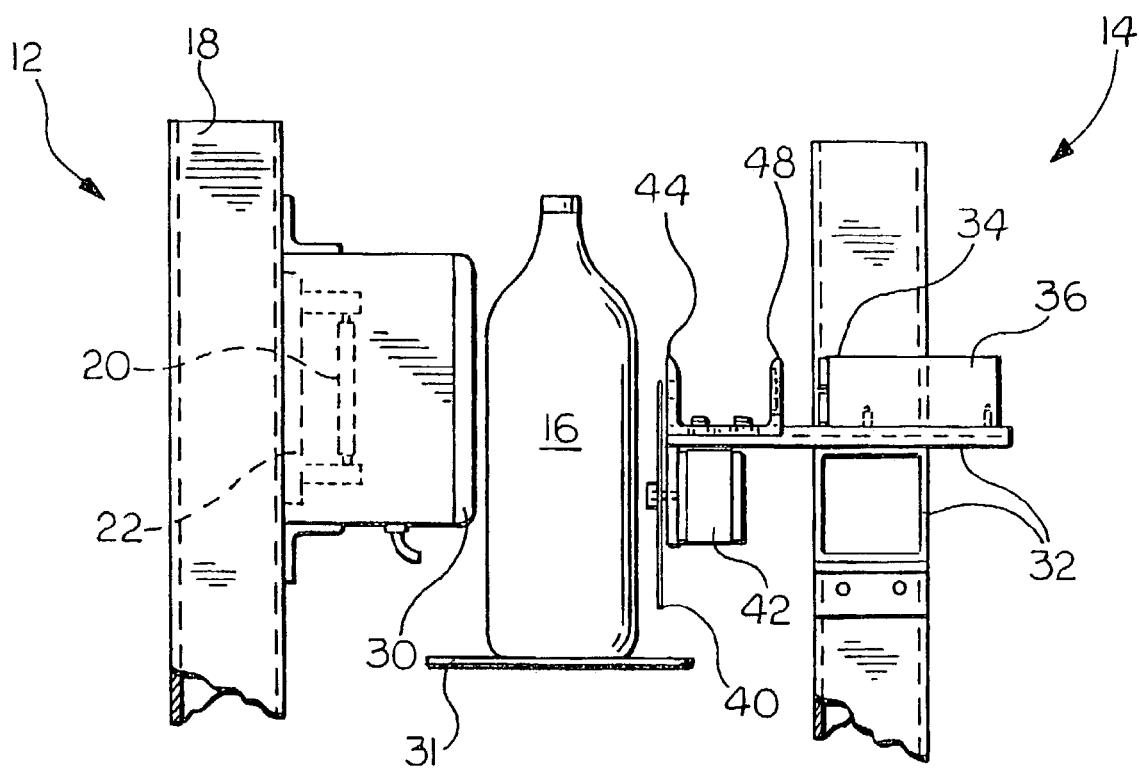
FIG. 3 is a side elevational view of the emitter assembly and the sensor assembly portions of the plastic container wall thickness measuring system illustrated in FIG. 1.

Referring now to the drawings, and particularly FIG. 1, there is shown generally at 10 a plastic container wall thickness measuring system incorporating the features of the invention. Referring now to FIGS. 2 and 3, the wall thickness measuring system 10 includes an emitter assembly 12 and a sensor assembly 14. The emitter assembly 12 and sensor assembly 14 are spaced apart such that a plastic container 16, such a polyethylene terephthalate (PET), blow molded bottle, can be caused to travel there between.

The emitter assembly 12 includes a first support frame 18 made of a rigid material such as aluminum. The support frame 18 is configured for engagement with any suitable surface, such as a floor, and an associated plastic container manufacturing machine (not shown).

The emitter assembly 12 further includes at least one incandescent light bulb 20 for emitting light energy with a majority of the light energy output occurring in the infrared (IR) frequency range. Preferably, the bulb 20 emits light energy within the range of from about 2.40 to about 2.50 microns. A reflector 22 is disposed on the support frame 18 and positioned on the opposite side of each bulb 20 from the container 16. The reflector 22 reflects light energy emitted from the bulbs 20 to increase the intensity of the light energy in the direction of the plastic container 16. The reflector 22 also helps adjust the uniformity of the IR light energy emitted. In the embodiment illustrated, two bulbs 20 and one reflector 22 are shown, but it will be understood that any combination of one or more bulbs 20, and one or more reflectors 22 may be used. As shown in FIG. 1, an electrical distribution box 24 is coupled to a power source (not shown) by a first flexible power cord 25. The bulbs 20 are coupled to a direct current (DC) power converter 26 by a second flexible power cord 27. The DC power converter 26 is then coupled to the distribution box 26 by a third flexible power cord 28. The electrical distribution box 24 provides the voltage necessary to power the bulbs 20.

At least one dense light diffuser 30 is disposed opposite the reflector 22 in the optical path of the light energy generated by the bulbs 20, and forms one wall of an enclosure 32. Preferably, two or more diffusers 30 are used. The enclosure 32 encloses the bulbs 20 and the reflector 22 on all sides such that the light energy is directed only through the diffuser 30. The enclosure 32 is attached to the support frame 18 by any suitable means such as by bolts, gluing, or welding.

The diffuser 30 provides an area of uniform diffuse light, and is preferably positioned within the range of from about four to seven inches from the sensor assembly 14. The diffuser 30 is configured to be of a height suitable to direct light energy through the maximum height of the plastic container 16 to be inspected, and preferably between one and 1.5 times wider than the width of the container 16 to be measured. Preferably, the light diffuser is within the range of from about three to about four inches wide, and from about five to about eight inches high.

The container 16 is typically carried on the conveyor 31 of a plastic container manufacturing machine, such as an exit conveyor of a machine for blow-molding plastic containers, and caused to travel between the emitter assembly 12 and the sensor assembly 14 at a uniform velocity. The containers 16 will typically travel at a rate of from about two to about twenty containers per second. Although the measuring system 10 is shown associated with an exit conveyor of a machine for blow-molding plastic containers, the system 10 can be used during any stage of the plastic container manufacturing process. For example, the system 10 can be incorporated within a plastic container manufacturing machine, or can be used off-line.

The sensor assembly 14 includes a second support frame 32 made of a rigid material such as aluminum. The support frame 32 is configured for engagement with any suitable surface, such as a floor, or an associated plastic container manufacturing machine (not shown).

The sensor assembly 14 further includes a sensor 34 for receiving the light energy emitted by the bulbs 20. The sensor 34 must be sensitive to light energy within the range of from about 2.40 to about 2.50 microns. For example, sensors 34 made of lead sulfide (PbS) or lead selenide (PbSe) are sensitive within the range of from about 2.40 to about 2.50 microns. Preferably, the sensor 34 is made of PbS having a fast chemistry, the PbS sensor material being doped to enhance speed rather than sensitivity. Additionally, sensors made from PbS or PbSe are advantageous because they can be made in a small size, and have a simple electrical operation.

Although sensors 34 made from PbS and PbSe can experience both short term and long term drift in the required IR sensitivity range, both problems can be minimized or eliminated. The temperature of the sensor 34 can be controlled by a cooling means, such as, for example, a thermoelectric cooler (not shown), thereby eliminating the long-term drift, while computer monitoring of the clear light path sensitivity can compensate the short-term drift. Preferably, the thermoelectric cooler will cause the sensor 34 to operate at about 65 degrees Fahrenheit, however operating temperatures as low as −50 degrees Fahrenheit may be achieved.

It is important that reflection of the diffuse IR light energy from the front surface of the sensor 34 not be directed back at the container 16. Such a reflection can then be again reflected from the surface of the container 16 and produce an error in the measurement. Although the front surface of the sensor 34 can be coated with a material which absorbs the light energy, such absorption will result in an undesirable increase in the heat load on the sensor 34. Therefore, it is more advantageous to construct a sensor 34 having a highly reflective surface, but having a surface angled such that any reflected light energy is directed away from the container 16. The sensor 34 is disposed in a sensor enclosure 36. The enclosure 36 is attached to the frame 32 by any suitable means such as by bolts, gluing, or welding. The sensor 34 is further coupled to signal amplification circuits by a signal line (not shown).

A generally annular and planar chopper wheel 40 is disposed on the frame 32 adjacent to the container 16 and on the opposite side of the container 16 from the diffuser 30. The chopper wheel 40 is impermeable by IR light energy, and can be made of any rigid material, such as aluminum or plastic. The chopper wheel 40 includes a plurality of circumferentially extending elongated slots 41. In the preferred embodiment two slots 41 are illustrated. However, it will be understood that the chopper wheel 40 may include more than two slots 41. The chopper wheel 40 is caused to rotate by an electric drive motor (not shown), contained within a drive motor enclosure 42. The drive motor, and enclosure 42 are mounted to the frame 32 by any suitable means such as by bolts, gluing, or welding. The slots 41 in the chopper wheel 40 are arranged so that the light energy emitted by the bulbs 20, in the direction of sensor 34, will be interrupted as the chopper wheel 40 rotates. The drive motor causes the chopper wheel 40 to rotate at a high speed such that the light energy passing through the container 16 is interrupted by the chopper wheel 40 within the range of from about ten to about five hundred times per second. Preferably, the rate of light energy interruption is within the range of from about two hundred to about three hundred times per second.

A plate 44 is disposed on the frame 32 between the chopper wheel 40 and the sensor 34. The plate 44 includes an aperture 46 for limiting the area of the container 16 from which light energy can pass to the sensor 34, thereby limiting the area of the container 16 from which the wall thickness can be measured. In the embodiment illustrated, the aperture 46 has a generally rectangular shape, each side having a length within the range of from about two to about ten millimeters. The size of the aperture 46 limits the size of the area of the container 16 walls that can be measured and averaged to an area less than three hundred square millimeters. Preferably, the aperture 46 is a square shaped aperture having six millimeter sides, and is located within the range of from about one to about four inches from the sensor 34.

A narrow band pass light filter 48 is located between the plate 44 and the sensor 34. Preferably, the filter 48 is located as close as about one inch from to the sensor 34 so as to prevent stray, unfiltered light from reaching the sensor 34. The filter 48 blocks all light energy not within an absorption band equal to the absorption band of the molecular structure of the resin used to manufacture the container 16. For PET resin, for example, a desirable absorption band occurs at about 2.44 microns. At 2.44 microns, the absorption band is largely insensitive to water vapor or other volatile materials which can be absorbed by the resin. Although a desirable absorption band for PET resin occurs at about 2.44 microns, other absorption bands can be used in the invention. For example, absorption bands of about 2.92 microns or about 1.62 microns may also be selected and used.

Preferably, a thin film interference filter will be used to provide the best narrow band pass with a high transmission in the desired IR range of about 2.40 to about 2.50 microns. The filter 48 must be large enough to prevent any light energy from passing around the edges thereof, and to allow only filtered IR light energy to arrive on the sensor 34. Although in the embodiment illustrated the filter 48 is located between the plate 44 and the sensor 34, it is understood that the filter 48 can be placed anywhere between the bulb 20 and the sensor 34.

Figure 4:
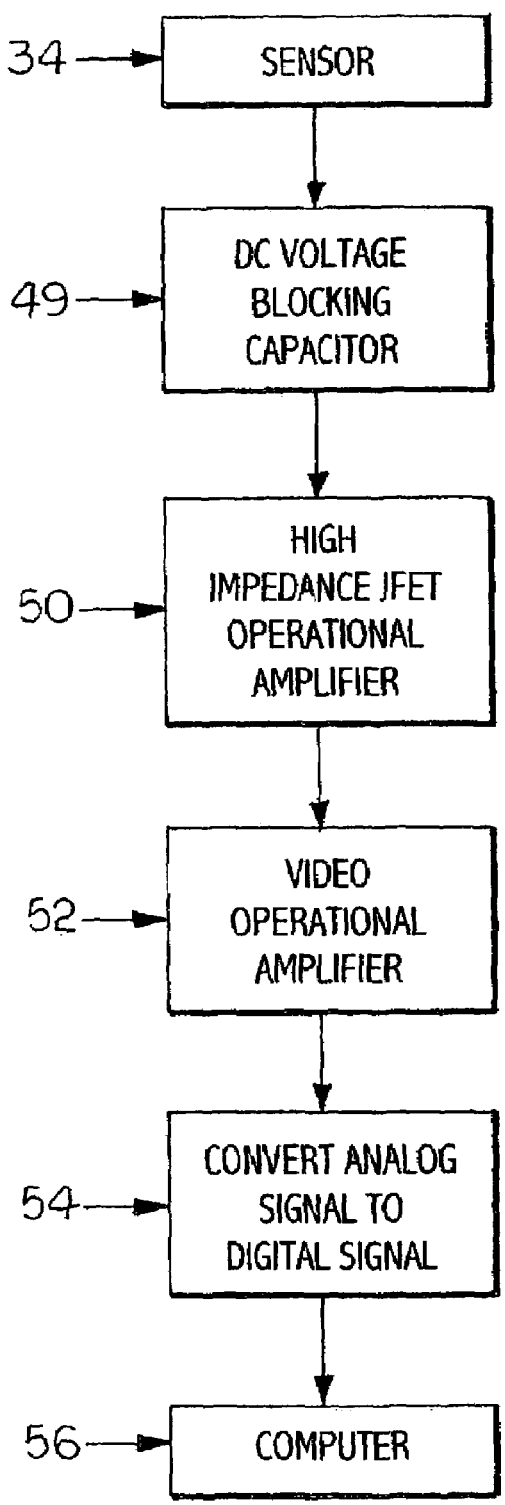
FIG. 4 is a schematic block diagram of the electronic circuits used to condition and amplify the signal from the sensor of the wall thickness measuring system illustrated in FIG. 1.

A schematic block diagram of the electronic circuits used to condition and amplify the signal from the sensor 34 is illustrated in FIG. 4. Since a solid state sensor such as a PbS sensor 34 is a high resistance device, any loading by the amplification circuit would create an error in the reading. Therefore the electrical signal is first introduced into a DC voltage blocking capacitor 49. The signal is then introduced into a high impedance junction field effect transistor (JFET) operational amplifier 50 with one hundred percent negative feedback. The JFET amplifier 50 provides unity gain, nearly infinite input resistance, and a low resistance output to feed into the following voltage and power amplification stage. The electrical signal is next introduced into a video operational amplifier 52, such as an 847 video operational amplifier manufactured by Analog Devices, Incorporated. The video operational amplifier 52 is disposed to receive an electrical signal from the JFET amplifier. The video operational amplifier 52 provides a voltage gain within the range of from about ten to one hundred. The amplifier 52 provides an accurate and reliable signal, and a sufficient current to drive a shielded, low noise line 54, such as a twisted-wire pair, or a terminated coaxial cable, to a computer 56. The JFET amplifier 50 and the video operational amplifier 52 are disposed in the enclosure 36, and are preferable located adjacent the sensor 34. The computer 56 is coupled to the electronic distribution box 24 by a fourth flexible power cord 60. Prior to being processed by the computer 56, the analog signal from the amplifier 52 is converted to a digital signal by a digital signal converter 54 disposed within the computer 56.

The plastic container wall thickness measuring system 10 operates by directing the sensor 34 toward the walls of the container 16. The uniform diffuse IR light emitted through the diffuser 30 passes through both walls of the container 16 and to the sensor 34. The diffuse light washes out the dark spots which can occur due to bumps, stria, and other irregularities in the sidewalls of the container 16. Further, the container 16 of a typical blow molding operation tends to have a uniform circumferential wall thickness. However, wall thickness variations in the vertical axis of such a container 16 are difficult to control. The wall thickness in the vertical axis is therefore frequently not uniform. By measuring the optical absorption of the IR light energy through both walls of the container 16, at a wavelength which corresponds to the molecular absorption band of the container 16 resin, and after correcting for variations in geometry and reflection, a valid and accurate value for the thickness of the two walls can be calculated. Simply dividing the two-wall value by two gives an average value for single wall thickness.

Figure 6:
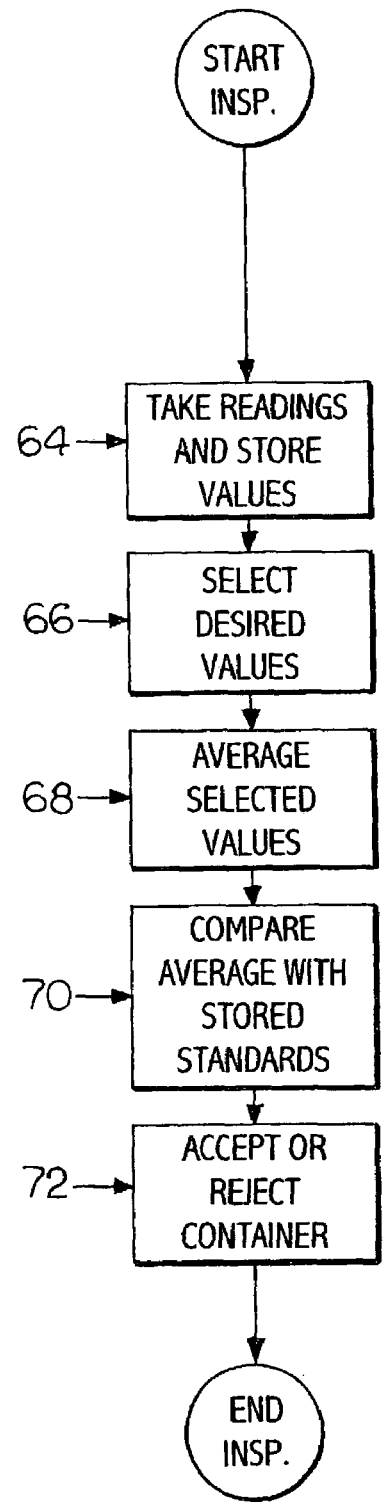
FIG. 6 is a flow diagram of the inspection method used in the wall thickness measuring system illustrated in FIG. 1.

A flow diagram of the inspection method of the current invention is illustrated in FIG. 6. The chopper wheel 40 is preferable caused to rotate at a rate of about two hundred fifty revolutions per second. Each half-revolution of the chopper wheel 40 defines one chop cycle. During each chop cycle light intensity data is preferably received by the sensor 34 and processed by the computer 56 at a rate of about 49 times per chop cycle. Two types of light intensity data are received during each chop cycle. First, a plurality of light readings are received at the sensor 34 as light energy passes through a slot 41 of the chopper wheel 41. Second, an similar number of dark readings are received at the sensor 34 as the IR impermeable portion of the chopper wheel 40, located between the slots 41, passes between the bulbs 20 and the sensor 34.

From the light intensity data received during each chop cycle, the computer selects and averages from about five to about seven of the light readings having the highest intensity, and selects and averages from about five to about seven of the dark readings having the lowest intensity. The average of the dark readings is then subtracted from the average of the light readings to result in an average intensity value for each chop cycle. Preferably, within the range of from about ten to about fifty such intensity values will be determined for each container 16 as each container 16 passes between the emitter assembly 12 and the sensor assembly 14.

The computer 56 then stores the value received 64, and preferably selects and averages from about three to about six of the highest intensity values 66 from the about ten to about fifty values to result in an average intensity value for each container 68. The computer 56 next compares the average intensity value for each container with stored measurement standards 70. Based on the stored measurement standards, the computer 56 then accepts or rejects each container 72, and displays the inspection result on a computer monitor 73.

An important feature of the invention is the means by which the measurement system 10 is calibrated. Because of slight differences in sensor 34 geometry and sensitivity, no two sensors 34 have the same calibration constants, therefore each measuring system 10 must be calibrated. Calibration further eliminates many of the geometric factors that would otherwise be considered in the calculation of a wall thickness.

Figure 5:
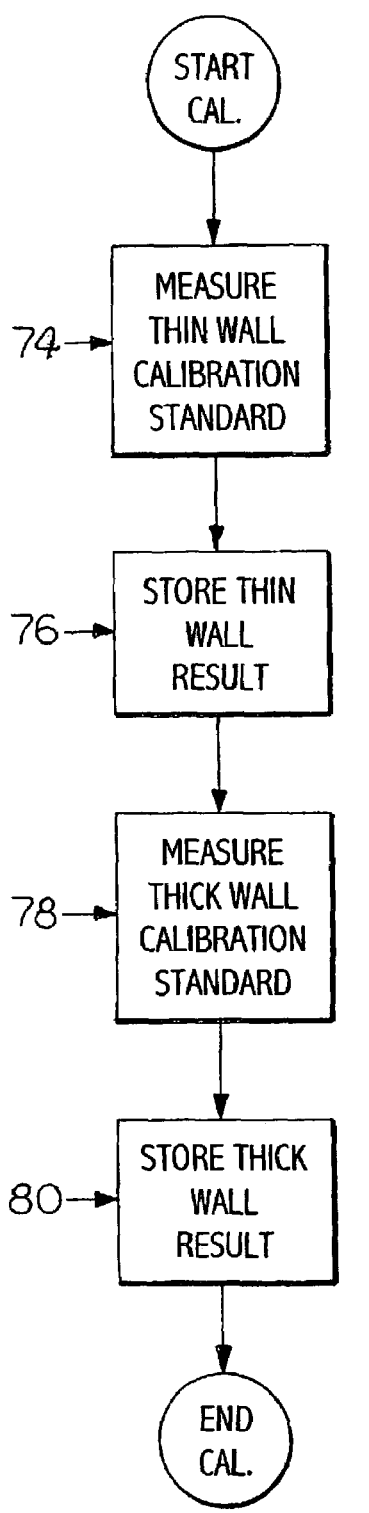
FIG. 5 is a flow diagram of the calibration method used in the wall thickness measuring system illustrated in FIG. 1.

The calibration is accomplished by creating two samples comprising two spaced-apart wall sections of known thickness, and of the same material being used to produce the containers 16. One sample will have two thin walls and one sample will have two thick walls. A flow diagram of the calibration method is illustrated in FIG. 5. According to the method, the thin wall sample is first placed in the path of the light energy 74. The computer 56 then makes the desired number of readings, and processes and stores the result 76, as described in the inspection method, above. The process is repeated with the thick wail sample 78, 80. The computer system can then calculate the two system constants needed to convert any light energy reading into a wall thickness, thereby ending the calibration.

The system constants determined during calibration are the absorption coefficient (A) and the intensity coefficient ($I_0$). Wall thickness is determined by an equation:

$$t = -1/A \log (I_0/I)$$

where t is the wall thickness, A is the absorption coefficient, $I_0$ is the intensity coefficient, and I is the measured intensity of an unknown thickness. Because the computer calculates A and $I_0$ during calibration, the wall thickness, t, can be easily calculated.

Because the sensors 34 can be quite small, it is also possible to stack a plurality of sensor assemblies 14 vertically to obtain multiple thickness measurements at different positions along the vertical axis of a container 16. Such a stack of sensor assemblies 14 can be used to constantly check a critical location on the container 16 and monitor vertical wall thickness distribution.

It has been found that the average wall thickness values obtained by the method of this invention agree very closely with manual measurements made by carefully sectioning and physical gauging of plastic containers.

Another advantage of the method of this invention is that the optical wall thickness measurement system 10 can be installed on the output conveyor of a high speed blow molding machine to measure the average wall thickness at one or more predetermined heights on every container 16.

Another advantage of the method of this invention is that the optical wall thickness measurement system 10 can be installed within a high speed blow molding machine to measure the average wall thickness at one or more predetermined heights on every container 16.

A further advantage of the method of this invention is that the optical wall thickness measurement system 10 can make thickness measurements of both sidewalls on each container simultaneously.

Yet another advantage of the method of this invention is that multiple wall thickness measurements can be taken while the high-speed blow molding machine is operating at full production speed. These data are displayed on a computer monitor 73, and are thereby readily accessible to the machine operator. Data trends are clearly visible, so the operator can anticipate problems before a bad container 16 is produced. The computer system which controls the system, and performs the necessary calculations, can also create a time record of the measurements made on the product stream.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A method for measuring the wall thickness of plastic containers including:
   providing a plastic container, the plastic container having a longitudinal axis and at least two side walls spaced radially from the longitudinal axis, the side walls being formed of a material that absorbs light energy in a predetermined molecular absorption band;
   causing the plastic container to travel along a path of travel;
   directing light energy from a source through the at least two sidewalls of the plastic container in a plane transverse to the longitudinal axis as the plastic container travels along the path of travel;
   sensing a portion the light energy that passes through the side walls of the plastic container; and
   generating a signal from the sensed portion of the light energy representing a thickness of the sidewalls of the plastic container.

2. The method according to claim 1, wherein the source of light energy includes at least one incandescent bulb for generating the light energy.

3. The method according to claim 1, wherein the source of light energy includes at least one light emitting diode for generating the light energy.

4. The method according to claim 1, wherein the source of light energy includes at least one heat radiating means radiating heat in a range above 800 degrees Fahrenheit for generating the light energy.

5. The method according to claim 1, wherein the material that absorbs light energy absorbs light energy within an absorption band which yields an absorption within the range of from about one to about seventy percent of a transmission of the light energy in a selected thickness range.

6. The method according to claim 1, wherein the source of light energy emits the light energy with an infrared wavelength corresponding to a molecular absorption band which is characteristic of a resin material used in forming the side walls of the plastic container.

7. The method according to claim 6, wherein the source of light energy emits the light energy within a wavelength range of from about 2.40 microns to about 2.50 microns.

8. The method according to claim 1, including positioning a reflective surface to reflect the light energy from the source toward the side walls of the plastic container.

9. The method according to claim 1, including carrying the plastic container along a path on a conveyor of a plastic container manufacturing machine, such as an exit conveyor of a machine for blow-molding plastic containers.

10. The method according to claim 1, including performing the steps of directing, sensing, and generating within a plastic container manufacturing machine, such as a machine for blow-molding plastic containers.

11. The method according to claim 1, including directing the light energy through a light diffuser prior to the light energy being directed through the at least two side walls of the plastic container for uniformly diffusing the light energy.

12. The method according to claim 1, including passing the portion of the light energy exiting the plastic container through a rotating chopper wheel having a plurality of circumferentially extending elongated slots interrupting the portion of the light energy at a rate of within a range of from about 10 to about 500 times per second.

13. The method according to claim 1, including passing the portion of the light energy through an aperture in a plate, the aperture limiting an area on a surface of the side walls of the plastic container from which the portion of the light energy can be sensed, the area being an area less than about 300 square millimeters.

14. The method according to claim 1, including filtering the portion of the light energy by allowing only a predetermined wavelength range of the light energy passing through the plastic container to be sensed as the portion of the light energy.

15. The method according to claim 1, including sensing the portion of the light energy with at least one sensor responsive to light energy emissions having an infrared wavelength corresponding to a molecular absorption band which is characteristic of a resin used in forming the side wall of the plastic container.

16. The method according to claim 15, wherein the sensor is made from lead sulfide.

17. The method according to claim 15, wherein the sensor is made from lead sulfide having a fast chemistry.

18. The method according to claim 15, wherein the sensor is made from lead selenide.

19. The method according to claim 15, including a sensor having a reflective surface, the reflective surface angled such that the light energy is reflected in a direction away from the plastic bottle.

20. The method according to claim 15, including first performing a step of calibrating the at least one sensor by:
sensing a portion of light energy that passes through a thin wall calibration standard, the thin wall calibration standard being formed of two spaced apart portions of the material used to form the plastic container, the standard being formed thinner than an average desired thickness of the plastic container;
generating a first standard signal from the sensed portion of the light energy representing a thickness of the thin wall calibration standard;
sensing a portion of light energy that passes through a thick wall calibration standard, the thick wall calibration standard being formed of two spaced apart portions of the material used to form the plastic container, the standard being formed thicker than an average desired thickness of the plastic container;
generating a second standard signal from the sensed portion of the light energy representing a thickness of the thick wall calibration standard; and
calculating two system constants from the first and second standard signals for comparison with the signal representing the thickness of the side walls of the plastic container.

21. The method according to claim 1, including:
selectively sensing a clear light portion, the clear light portion being a portion of the light energy caused not to pass through the plastic container; and
adjusting the computer to correct for changes in light sensitivity and changes in sensor sensitivity.

22. The method according to claim 1, including performing the step of sensing at a rate within a range of from about 10 to about 50 times per plastic container.

23. The method according to claim 22, including performing the step of generating by averaging selected portions of the sensed portions.

24. The method according to claim 1, including sensing the portion of the light energy with a plurality of sensors arrayed parallel with the longitudinal axis of the plastic container so as to receive light energy from a corresponding plurality of positions along the longitudinal axis of the plastic container.

25. The method according to claim 24, including the array of sensors for determining a distribution of the thickness of the material used in forming the side walls of the plastic container.

26. The method according to claim 1, including displaying to an observer a wall thickness value corresponding to the thickness of the side walls of the plastic container.

27. The method according to claim 1, including displaying to an observer values corresponding to a trend in a distribution of the thickness of the material used in forming the side walls of the plastic container in a selected time period.

28. A plastic container wall thickness measuring system comprising:
a source of light energy directed toward a path of travel of a plastic container, the plastic container having side walls formed of a material absorbing a first portion of the light energy;
a light sensor for receiving a second portion of the light energy, the second portion of the light energy having passed through the side walls of the plastic container, and being responsive to the second portion of the light energy for generating a signal; and
a computer means connected to said sensor and being responsive to said signal when the plastic container moves along the path between said source and said sensor for calculating an average wall thickness value from a selected number of positions of the plastic container along the path, comparing said average wall thickness value with stored standards and indicating one of acceptance and rejection for the plastic container.

29. The plastic container wall thickness measuring system according to claim 28, wherein said source of light is an incandescent bulb that emits the light energy within a wavelength range of from about 2.40 microns to about 2.50 microns.

30. The plastic container wall thickness measuring system according to claim 28, including a light diffuser to diffuse the light energy prior to passing through the side walls of the plastic container.

31. The plastic container wall thickness measuring system according to claim 28, including a light filter for allowing one of the first and the second portions of the light energy having a wavelength within a wavelength range of from about 2.40 microns to about 2.50 microns to pass there through to said sensor.

32. The plastic container wall thickness measuring system according to claim 28, including a cooling means for maintaining a selected constant temperature within said system.

33. The plastic container wall thickness measuring system according to claim 32, wherein said cooling means includes a thermoelectric cooler.

34. The plastic container wall thickness measuring system according to claim 28, wherein said source of light energy is powered by a DC power source.

35. The plastic container wall thickness measuring system according to claim 28, wherein said light sensor is made from lead sulfide.

36. The plastic container wall thickness measuring system according to claim 28, wherein said light sensor is made from lead sulfide having a fast chemistry.

37. The plastic container wall thickness measuring system according to claim 28, wherein said light sensor is made from lead selenide.

38. The plastic container wall thickness measuring system according to claim 28, wherein said light sensor includes a reflective surface, the reflective surface angled such that the light energy is reflected in a direction away from the plastic bottle.

* * * * *

US006985221C1

(12) INTER PARTES REEXAMINATION CERTIFICATE (850th)

United States Patent
Semersky et al.

(10) Number: US 6,985,221 C1
(45) Certificate Issued: Mar. 26, 2014

(54) METHOD AND APPARATUS FOR MEASURING WALL THICKNESS OF PLASTIC CONTAINER

(75) Inventors: Frank E. Semersky, Toledo, OH (US); Dennis T. Sturgill, Perrysburg, OH (US)

(73) Assignee: Petwall, LLC, Holland, OH (US)

Reexamination Request:
No. 95/001,383, Jun. 23, 2010

Reexamination Certificate for:
Patent No.: 6,985,221
Issued: Jan. 10, 2006
Appl. No.: 10/220,404
Filed: Aug. 30, 2002

(21) Appl. No.: 95/001,383

(22) PCT Filed: Feb. 23, 2001

(86) PCT No.: PCT/US01/06012
§ 371 (c)(1),
(2), (4) Date: Aug. 30, 2002

(87) PCT Pub. No.: WO01/65204
PCT Pub. Date: Sep. 7, 2001

Related U.S. Application Data

(60) Provisional application No. 60/186,188, filed on Mar. 1, 2000.

(51) Int. Cl.
*G01B 11/06* (2006.01)

(52) U.S. Cl.
USPC .................... 356/239.6; 356/632; 250/223 B

(58) Field of Classification Search
USPC ........................................................ 356/632
See application file for complete search history.

(56) References Cited

To view the complete listing of prior art documents cited during the proceeding for Reexamination Control Number 95/001,383, please refer to the USPTO's public Patent Application Information Retrieval (PAIR) system under the Display References tab.

*Primary Examiner* — My Trang Nu Ton

(57) ABSTRACT

A method for measuring the wall thickness of plastic containers (16) during a container manufacturing process includes providing a plastic container (16), the plastic container (16) having a longitudinal axis and at least two side walls spaced radially from the longitudinal axis. The side walls are formed of a material that absorbs light energy in a predetermined molecular absorption band. Light energy is then directed from a source unit (32) through the at least two side walls of the plastic container (16) in a plane transverse to the longitudinal axis of the plastic container (16). A portion of the light energy that passes through the sidewalls of the container (16) is sensed by a sensor (34), and a signal representing a thickness of the sidewalls of the plastic container is generated from the sensed portion of the energy by a computer (56).

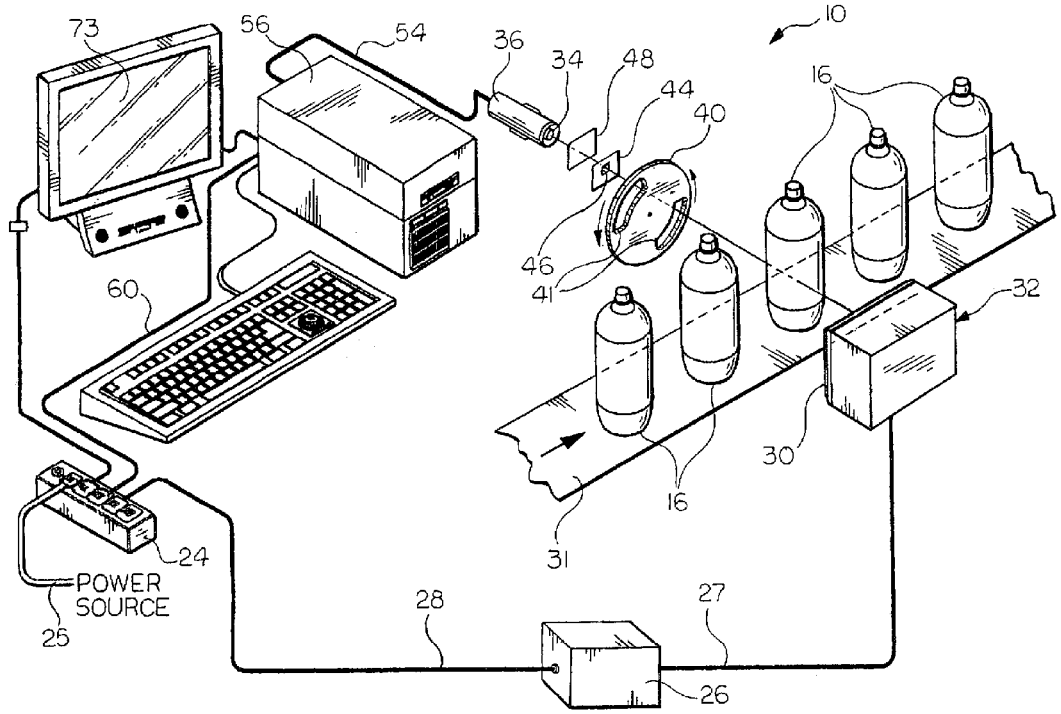

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-11 and 13-43 are cancelled.

Claim 12 is determined to be patentable as amended.

12. [The method according to claim 1, including] *A method for measuring the wall thickness of plastic containers including:*

*providing a plastic container, the plastic container having a longitudinal axis and at least two side walls spaced radially from the longitudinal axis, the side walls being formed of a material that absorbs light energy in a predetermined molecular absorption band;*

*causing the plastic container to travel along a path of travel;*

*directing light energy from a source through the at least two sidewalls of the plastic container in a plane transverse to the longitudinal axis as the plastic container travels along the path of travel;* passing [the] *a* portion of the light energy exiting the plastic container through a rotating chopper wheel having a plurality of circumferentially extending elongated slots interrupting the portion of the light energy at a rate of within a range of from about 10 to about 500 times per second*;*

*sensing the portion of the light energy that passes through the side walls of the plastic container; and*

*generating a signal from the sensed portion of the light energy representing a thickness of the sidewalls of the plastic container.*

\* \* \* \* \*